(12) United States Patent
Lv et al.

(10) Patent No.: US 12,223,260 B2
(45) Date of Patent: Feb. 11, 2025

(54) TEXT EDITING IN REMOTE DOCUMENTS ON MOBILE DEVICES

(71) Applicant: Omnissa, LLC, Mountain View, CA (US)

(72) Inventors: Lin Lv, Beijing (CN); Jian Ken Song, Beijing (CN); Bo Steven Liu, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/075,517

(22) Filed: Oct. 20, 2020

(65) Prior Publication Data

US 2022/0108060 A1 Apr. 7, 2022

Related U.S. Application Data

(63) Continuation of application No. PCT/CN2020/119811, filed on Oct. 5, 2020.

(51) Int. Cl.
*G06F 3/0485* (2022.01)
*G06F 3/04886* (2022.01)
*G06F 40/106* (2020.01)
*G06F 40/166* (2020.01)

(52) U.S. Cl.
CPC .......... *G06F 40/166* (2020.01); *G06F 3/0485* (2013.01); *G06F 3/04886* (2013.01); *G06F 40/106* (2020.01)

(58) Field of Classification Search
CPC ... G06F 40/106; G06F 40/166; G06F 3/04886
See application file for complete search history.

(56) References Cited

U.S. PATENT DOCUMENTS

| 6,950,817 | B1* | 9/2005 | Bernard | G06F 16/284 |
| 6,950,987 | B1* | 9/2005 | Hargraves | G06F 40/166 709/217 |
| 2004/0253568 | A1* | 12/2004 | Shaver-Troup | G09B 17/00 434/178 |
| 2007/0220417 | A1* | 9/2007 | Mathew | G06F 40/166 707/E17.116 |
| 2011/0081083 | A1* | 4/2011 | Lee | G06V 30/1456 345/173 |
| 2012/0117611 | A1* | 5/2012 | Wookey | G06F 21/10 726/33 |

(Continued)

OTHER PUBLICATIONS

"Define clipboard", Microsoft Bing, https://www.bing.com/search?q=define+clipboard&src=IE-SearchBox&FORM=IESR3N, search dated on Jan. 29, 2022, pp. 1-3. (Year: 2022).*

(Continued)

*Primary Examiner* — Kavita Stanley
*Assistant Examiner* — William Wong
(74) *Attorney, Agent, or Firm* — Kim & Stewart LLP

(57) ABSTRACT

Embodiments are described for editing a remote document residing on a server that is accessed by a mobile device over a remote desktop connection, by downloading portions of text to be locally edited from the remote document to the mobile device, performing edits on the downloaded text locally on the mobile device in an interface optimized for mobile device text editing, and conveying the edited portions back to the server to be inserted into a corresponding place in the document.

20 Claims, 8 Drawing Sheets

(56) References Cited

U.S. PATENT DOCUMENTS

| | | | | |
|---|---|---|---|---|
| 2013/0174079 | A1* | 7/2013 | Morley | G06F 3/0236 |
| | | | | 715/773 |
| 2014/0258155 | A1* | 9/2014 | Suryanarayanan | ......................... |
| | | | | H04L 67/1021 |
| | | | | 726/29 |
| 2015/0058286 | A1* | 2/2015 | Leibovici | G06F 9/5055 |
| | | | | 707/610 |
| 2015/0135300 | A1* | 5/2015 | Ford | G06Q 50/18 |
| | | | | 726/11 |
| 2016/0018968 | A1* | 1/2016 | Wilson | G06Q 30/0203 |
| | | | | 715/763 |
| 2016/0364201 | A1* | 12/2016 | Beveridge | H04L 67/28 |
| 2017/0201578 | A1* | 7/2017 | Wesley | G06F 9/45558 |
| 2017/0235483 | A1* | 8/2017 | Alonso Ruiz | G06F 3/04845 |
| | | | | 715/773 |
| 2018/0129510 | A1* | 5/2018 | Zhang | G06F 3/1423 |
| 2020/0310835 | A1* | 10/2020 | Momchilov | G06F 9/45533 |

OTHER PUBLICATIONS

"Plain text", Microsoft Bing, https://www.bing.com/search?q=plain+text&src=IE-SearchBox&FORM=IESR3N, search dated on Jan. 29, 2022, pp. 1-4. (Year: 2022).*

Google, "what is meant by plain text", https://www.google.com/search?q=what+is+meant+by+plain+text, search performed on Jun. 9, 2024, 2 pages. (Year: 2024).*

\* cited by examiner

TEXT EDITING IN REMOTE DOCUMENTS ON MOBILE DEVICES

CLAIM OF PRIORITY

This application is a continuation of International Application PCT/CN2020/119811, entitled "TEXT EDITING IN REMOTE DOCUMENTS ON MOBILE DEVICES", by Lin Lv et al., with an international filing date of Oct. 5, 2020, which is incorporated by reference herein in its entirety.

TECHNICAL FIELD

The present disclosure generally relates to virtual desktops, and more specifically to techniques for efficient text editing in remote documents on mobile devices.

BACKGROUND

As virtual desktops and remote computing becomes increasingly commonplace, more and more users are using mobile devices to access and edit documents remotely. However, with conventional technology, the user experience when editing text in remote documents on mobile devices is often poor.

When a user accesses a remote document on a mobile device, the graphical user interface (GUI) of the application containing the document is streamed to the mobile device and displayed to the user on the screen, while the user's inputs on the mobile device (e.g., cursor movements or key inputs) are conveyed over a network to a server hosting the application to be effectuated therein. Normally, the user interface of the remote application is designed for conventional, non-mobile devices that may be equipped with a bigger screen, a mouse, and a keyboard. When accessing the remote application on a mobile device, the user generally sees the same interface designed for conventional devices that has been scaled to fit the screen of the mobile device. Because of the limited screen size of mobile devices and limited input capabilities, working with text and performing edits in such interfaces is often inconvenient. For example, users may lack the requisite level of control over the placement of the cursor or pointer when using a finger on a touchscreen, and other interface features such as keyboard entry, text editing tools, menus, etc. are also generally not mobile device-friendly.

To compound the issues, when a user makes an input on the mobile device, the input is conveyed to the remote application on the server, the GUI is updated to reflect the input, and the updated GUI is conveyed back to the user's device. Due to this round trip, responses to user inputs can be noticeably delayed. In document editing, such delays can be particularly hindering. For example, the delays can make the cursor or keyboard feel frustratingly unresponsive to the user. The problem is exacerbated when there are latencies in the network, such as when the remote desktop is on a public cloud.

A more efficient approach is desirable for editing text in remote documents on mobile devices.

DETAILED DESCRIPTION

Figure 1:
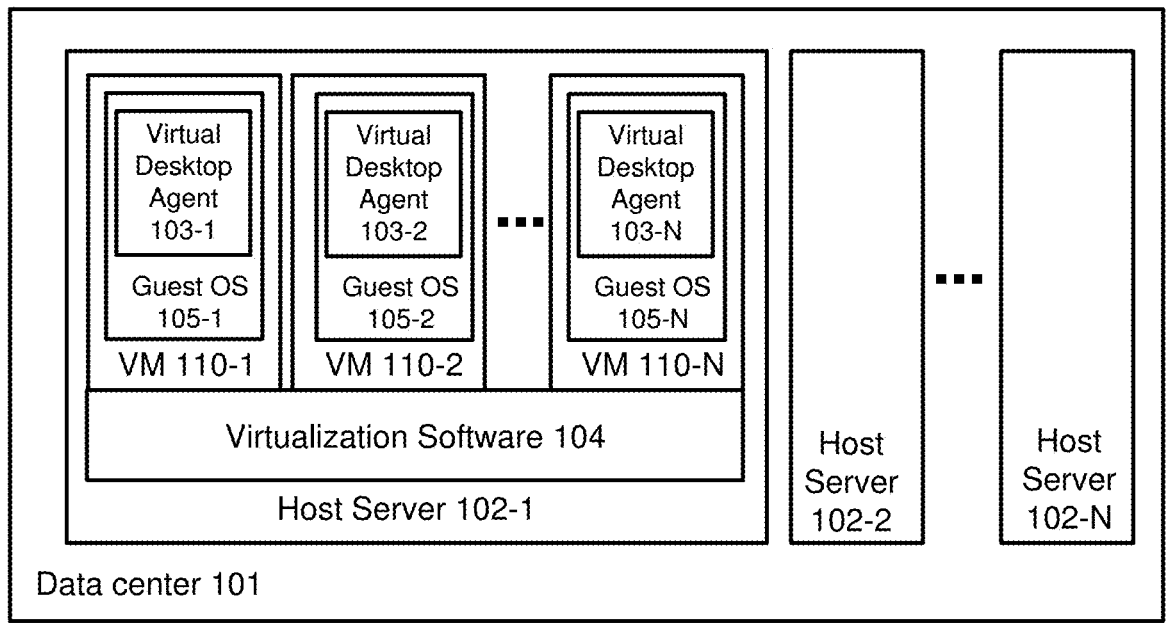
FIG. 1 illustrates an example of a virtual desktop environment, in accordance with various embodiments.
Figure 1:
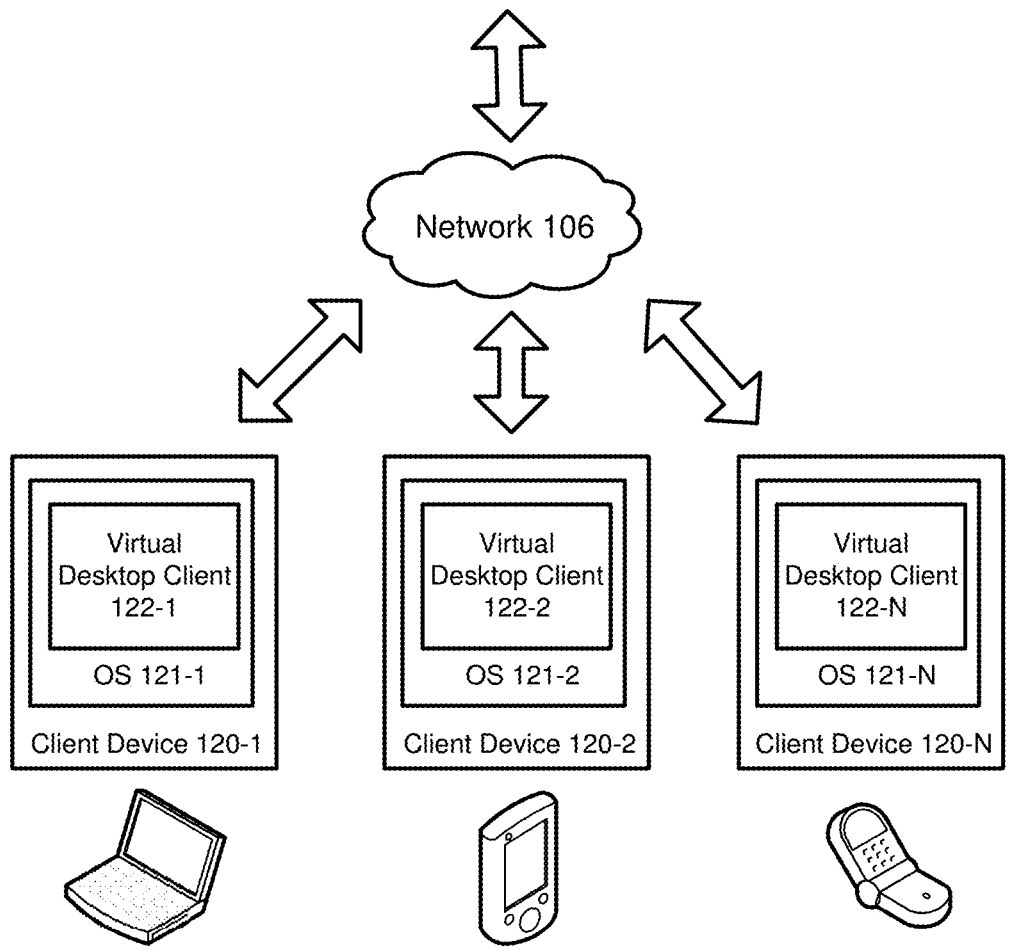

Systems and methods in accordance with various embodiments of the present disclosure overcome at least some of the above-mentioned shortcomings and deficiencies by providing more efficient ways to edit text in remote documents on mobile devices. In particular, embodiments described herein provide systems and methods for editing a remote document residing on a server that is accessed by a mobile device over a remote desktop connection, by downloading portions of text to be edited from the remote document to the mobile device, performing edits on the downloaded text on the mobile device in an interface optimized for mobile device text editing, and conveying the edited portions back to the server to be inserted into a corresponding place in the document.

The process begins by a user accessing a remote document on a mobile device over a network. The document may be opened in an application that allows text editing running in a remote desktop on a server. User interaction with the application and the document opened therein can be enabled using a remoting protocol (e.g. PCOIP, VNC, Blast, etc.) by conveying the user's inputs on the mobile device over the network to the remote desktop and injecting the inputs into the application to be effectuated therein. The GUI of the remote desktop containing display information (e.g. framebuffer pixel data) of the application and showing the document can be streamed back to the mobile device and displayed to the user on the mobile device screen.

While the user may be able to edit the document by providing input data such as mouse and keyboard events on the mobile device that are conveyed to the remote application and effectuated on the document therein, as is conventionally performed in the context of remote desktop access, this may be inefficient and inconvenient for several reasons discussed above. For example, the user interface of the application on the remote server is typically designed for traditional desktops, which may not be well suited for mobile device access, making functions such as cursor control and character input difficult. Further, editing may be inefficient due to latencies in the network.

In various embodiments, to resolve such issues, the mobile device can offer the user remote review and edit modes that can be triggered by the user on the mobile device when the user wants to conveniently review or edit portions of the document locally instead of communicating user input events to the remote server over a network connection. When the user triggers these local editing modes, the mobile device can download text associated with the portions of the document being viewed by the user and present those portions to the user locally on the mobile device in a mobile-friendly interface that allows for convenient text selection and editing on the mobile device optimized for touchscreens and limited screen sizes. After the user performs the edits, the edited text can be conveyed back to the remote desktop, where it can be inserted or merged into the document. As a result, an effective and convenient way is provided for a user to edit documents residing on remote desktops with the advantages of local interaction and a mobile-optimized interface.

The system can be implemented in various types of remoting and virtualization environments where a user accesses a document residing on a remote server via the user's mobile device. The document may be, for example, in a virtual or a remote desktop, or in a virtual or remote application. As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional virtual desktop infrastructure (VDI) or desktop as a service (DAAS) environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard, touchscreen, and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

With virtual applications, instead of providing a user with a full desktop session, i.e., where the user gets to see and interact with the entire desktop, the user can be given access to a single particular application on the desktop, so that he or she is able to see and interact with the application and not with other parts of the virtual desktop, which can be hidden from the user. This approach is preferable, for example, when an enterprise wishes to deliver access to a particular application to users, without giving access to the remainder of the computing environment where the application runs. This type of session is referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

As mentioned previously, a virtual application session can be considered a virtual desktop session in which user access is restricted to the particular application. In various embodiments, an environment such as the example illustrated in FIG. 1 can be used for deployment of a virtual application. For example, the virtual application can be installed on the guest OS (e.g., 105-1, 105-2, 105-N) of a VM (e.g., 110-1, 110-2, 110-N) and a user of the client device (e.g., 120-1, 120-2, 120-N) can access and interact with the application via the virtual desktop client (e.g., 122-1, 122-2, 122-N) and virtual desktop agent (e.g., 103-1, 103-2, 103-N) in the same way as described above in the context of virtual desktop sessions. However, in the case of the virtual application session, the user can be restricted to interacting with only the application and may be blocked from interacting with or viewing other portions of the virtual desktop. Similar to provision of virtual desktops, user inputs on the client device (e.g., 120-1, 120-2, 120-N) can be routed to the application and the application UI can be streamed to the virtual desktop client (e.g., 122-1, 122-2, 122-N) and presented to the user.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

It should also be noted that different approaches for providing remote desktop environments are possible and the invention is not limited to any particular type of remote desktop environment. In various embodiments, the invention can be implemented in any applicable environment where a document can be opened in an application executing on a remote server, whether the application is in a remote desktop, virtual desktop, directly on the server OS, or otherwise, provided that the user is able to interact with the document remotely from the user's mobile device. For example, in some environments, user applications can run directly on the server operating system rather than in a guest operating system. In some environments, users can share a virtual machine, which may run on a server operating system. As applicable, such environments can also utilize a client and an agent, analogous to the client (e.g., 103-1, 103-2, 103-N) and agent (e.g., 122-1, 122-2, 122-N) described in FIG. 1, for enabling communication between a user's mobile device and the remote desktop or remote application.

Figure 2:
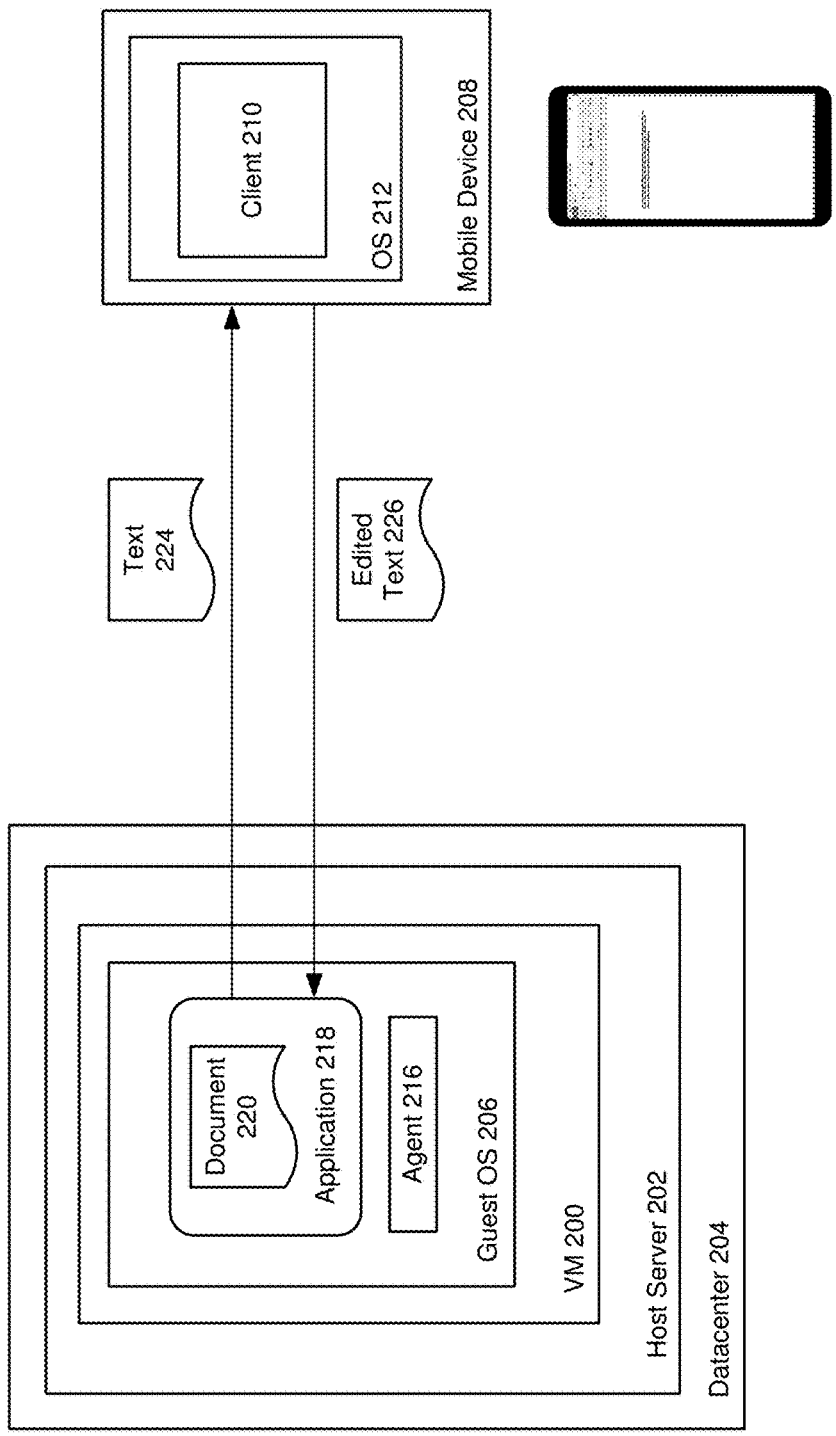
FIG. 2 illustrates an example architecture of a system for efficient text editing in remote documents on mobile devices, in accordance with various embodiments.

FIG. 2 illustrates an example architecture of a system for efficient text editing in remote documents on mobile devices, in accordance with various embodiments. The example of FIG. 2 illustrates a VM 200 that runs on a host server 202 in a datacenter 204 and provides a virtual desktop that is presented by a guest OS 206 to a user of a remote mobile device 208 connected to the VM 200 over a network. In this example, the mobile device 208 is a smartphone, however, in other embodiments the mobile device can be a tablet or another kind of device. While only one VM 200 is illustrated in this example, a real-world implementation may include multiple VMs hosted on the server 202, as in the example of FIG. 1. The datacenter 204 may be an on-premises datacenter of an enterprise or a cloud-based datacenter. As will be appreciated by those skilled in the art, the configuration of the components in FIG. 2 is given by way of example and other configurations are possible without straying from the spirit of the invention.

Interaction between the virtual desktop and the mobile device 208 can be facilitated by a client 210 running in an OS 212 on the mobile device 208, which communicates with a server-side agent 216 running on the guest OS 206 inside the virtual machine 200. In particular, the interaction can be performed by the agent 216 transmitting encoded visual display information (e.g., framebuffer data) over the network to the client 210 and the client 210 in turn transmitting user input events to the agent 216.

To access the remote desktop, the user of the mobile device 208 can launch the client 210 on the mobile device 208 and the client 210 can connect to the remote desktop via the agent 216 (e.g., after user login credentials are confirmed). Once the client 210 is connected to the agent 216, the user can view the GUI of the remote desktop in the client 210 user interface (UI). That is, the GUI can be streamed by the agent 216 to the client 210 and displayed in the client 210 window on the mobile device 208.

Throughout this disclosure, the client 210 and agent 216 are described as containing various functionality that enables local, mobile-optimized text editing and reviewing on the mobile device 208. It should be noted that, in other embodiments and as applicable, any part of this functionality can be performed on the mobile device 208 and server 202 by components other than the client 210 and agent 216 (e.g., by other components running in the OS 212 and guest OS 206).

After connecting to the remote desktop, the user can open a document 220 in the remote desktop via the client 210 user interface. The document can be opened in an application 218 executed in the guest OS 206. The application 218 can be any kind of application with text editing or word processing capability, such as Microsoft® Word, Microsoft® Notepad, Microsoft® WordPad, etc. Once the document 220 is opened in the remote desktop, the user can view the document 220 on the mobile device 208. That is, the document 220 can be displayed in the application 218 UI in the GUI that is streamed by the agent 216 to the mobile device 208 and displayed in the window produced by the client 210 on the mobile device 208 screen. The user can interact with the document 220 by producing inputs in the client window on the mobile device 208 and the inputs can be conveyed by the client 210 to the agent 216 and injected into the application 218 to be effectuated therein.

Figure 3:
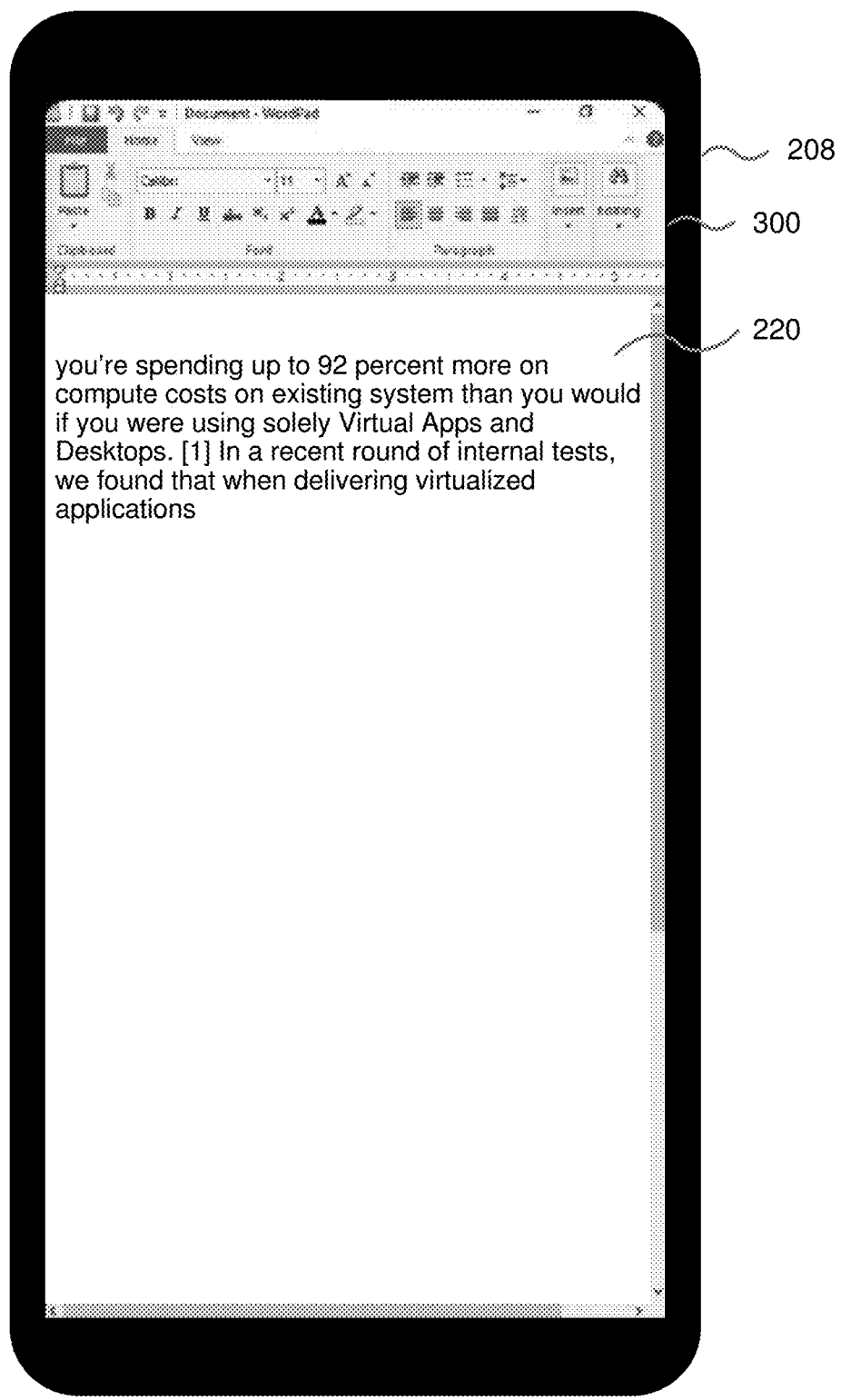
FIG. 3 illustrates an example of a remote document displayed in a client on a mobile device, in accordance with various embodiments.

FIG. 3 illustrates an example of a remote document displayed in a client on a mobile device, in accordance with various embodiments. In this example, the mobile device 208 shows a window 300 of the client 210 (here, the client window 300 takes up the entire screen), which displays the GUI of the remote desktop that is being streamed from the remote desktop. The GUI displays the document 220 that is opened in the application 218 on the server 202. In this case, the application 218 is Microsoft® WordPad.

In various embodiments, the user can interact with the application 218 and the document 220 by making inputs in the client window 300, which are conveyed by the client 210 to the virtual desktop to be effectuated therein. As was done in past technologies, the user can edit the document 220 in this fashion, by making editing inputs in the client 210 on the mobile device 208, which are conveyed to the agent 216 in the remote desktop and implemented on the document 220. However, as described above, in many cases this is inconvenient and inefficient.

Returning to the example of FIG. 2, in various embodiments, to make editing the remote document 220 on the mobile device 208 more efficient and convenient for the user than previous technologies, the client 210 and agent 216 can contain various functionality that enables local, mobile-optimized text editing and reviewing on the mobile device 208. When the user desires to edit or review text in the remote document 220 locally, the user can activate a remote mode by making an input in the client 210 UI, such as by pressing and holding a finger on the screen, pressing a button or menu item, or via another action. As will be described in greater detail below, in various embodiments, the remote mode can be a Remote Review mode or a Remote Edit mode.

When the client 210 receives a request (e.g., from the user) to activate a remote mode, it can send a request to the agent 216 to transfer text (in an editable format) from the document 220 to the client 210. In response to the request, the agent 216 can first check if the current active window in the remote desktop (or the application 218) is an application with text editing capability, such as Microsoft® Word, Microsoft® Notepad, Microsoft® WordPad, etc. If it is, then the agent 216 can copy or extract the text, or a portion thereof, from the document 220 and transfer the text 224 to the mobile device 208. If it is not, then the agent 216 can produce a message indicating that the document cannot be edited (e.g., an error message).

Different techniques can be used to determine what portions of text to transfer to the mobile device 208. For example, the portion of the document 220 text that is displayed on the mobile device 208 (in the client 210 UI), or just the portion that is displayed in the application 218 UI on the remote desktop, at the time of the request may be transferred initially. Then, when the user scrolls to other portions of the document while in a remote mode on the mobile device 208, additional text can be transferred to provide those portions. In other embodiments, the entire document or other portions may also be included in the initial transfer.

Once the client 210 receives the text 224 from the agent 216, the user can edit the text 224 locally on the mobile device 208. For example, the client can present the received text 224 from the agent 216 in a remote editing mode UI, which can be optimized for mobile use and allow the user to edit the text 224 locally and conveniently on the mobile device 208. Remote mode UIs and other aspects of remote modes will be discussed in greater detail below.

In various embodiments, after the user performs edits on the received text 224, the edited text 226 can be transferred back to the remote desktop. For example, the text 226 can be transferred by the client 210 to the agent 216 when the user saves the edits (e.g., by pressing a "save" button in the remote mode UI) or when the user exits a remote mode (e.g., by pressing an "exit remote mode" button on the remote mode UI).

The agent 216 can receive the edited text 226 and insert it into a corresponding position in the remote document 220. For example, the agent 216 can replace the parts in the document 220 that were copied and sent to the client 210 (the text 224) with the edited text 226 that it receives from the client 210.

In various embodiments, the text 224 can be transferred by the agent 216 in a plain text format. For example, if the original text contains formatting, then the agent 216 can extract the plain text from the copied text and save the formatting details of the copied text. When edited text 226 is received from the client 210, it can then be merged with the saved formatting details (i.e., the formatting details can be applied to the edited text 226) before the edited text 226 is inserted into the corresponding position in the document 226, in order to preserve formatting. In another embodiment, the text 224 can be transferred in the original format (i.e., format appearing in the document 220) and the formatting can be preserved throughout the editing process so that the edited text 226 retains the original formatting in the document 220 before it was edited. In other embodiments, the text can be transferred in other formats as well and then merged with preserved or original formatting details to retain original formatting in the document 220.

As mentioned above, in various embodiments, the client 210 can implement a Remote Review mode and/or a Remote Edit mode to provide enhanced review and edit capabilities on the mobile device 208. In an embodiment, after opening the document 220, the user can activate the Remote Review mode by pressing and holding a finger on the screen of the mobile device 208 for a predetermined amount of time (e.g., two seconds). In other embodiments, the client 210 interface can present another method for triggering Remote Review mode, such as a button or menu item. When the Remote Review mode is triggered, a portion of the remote document 220 text (e.g., the portion being displayed on the mobile device 208 screen) can be transferred to the mobile device 208 and presented in a Remote Review interface on the mobile device 208.

Figure 4:
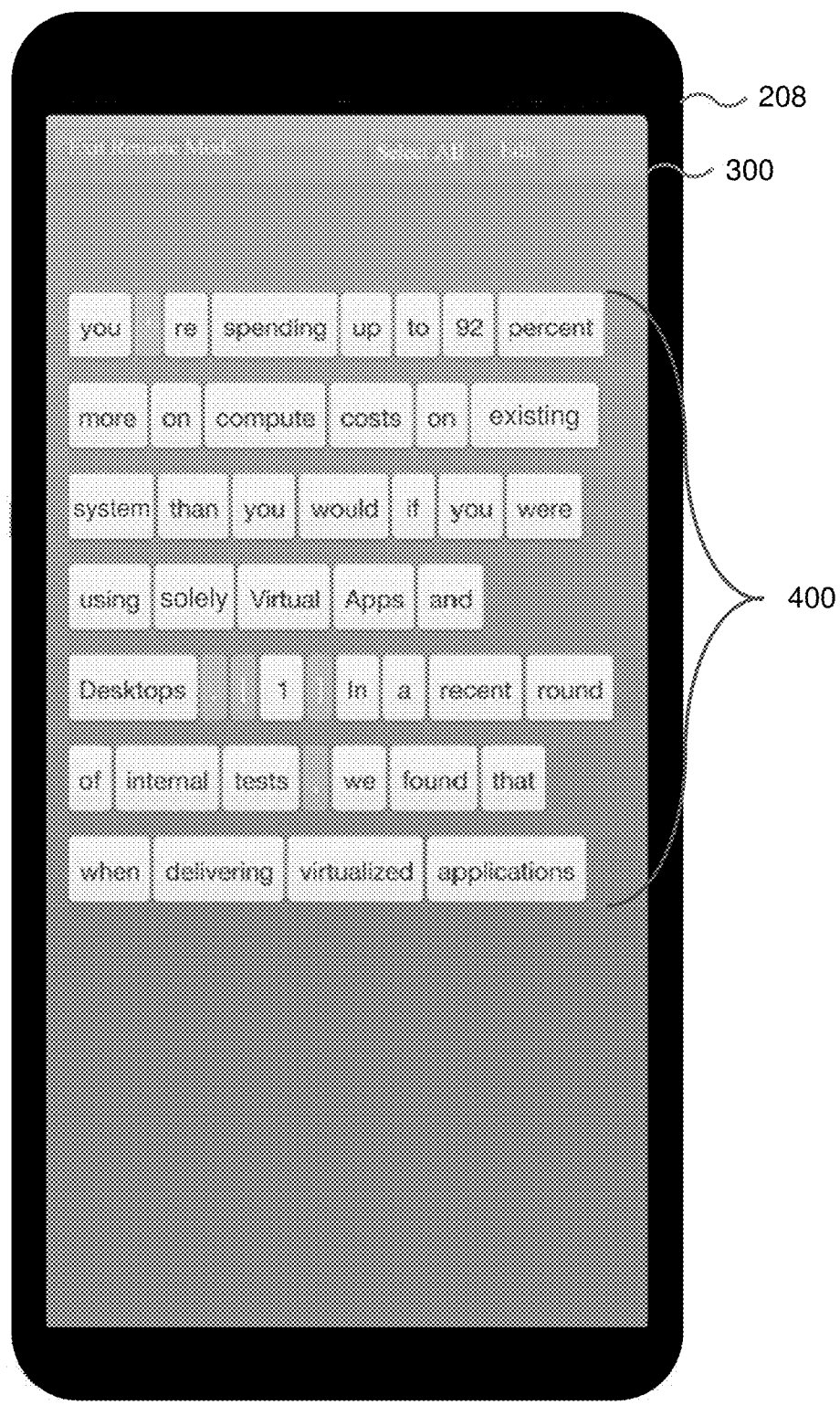
FIG. 4 illustrates an example of a mobile device in Remote Review mode, in accordance with various embodiments.

FIG. 4 illustrates an example of a mobile device in Remote Review mode, in accordance with various embodiments. As will be described in further detail below, the Remote Review mode provides the user with an enhanced ability to select text for performing various functions, such as to copy, look up, and forward the text selection on the mobile device. As illustrated in the example of FIG. 4, the client window 300 contains a Remote Review interface that displays text 400 transferred from the document 220. In various embodiments, when Remote Review mode is triggered, the remote document 220 text being displayed on the mobile device 208 screen at the time can be transferred to the mobile device 208 and presented in the Remote Review interface. For example, the text 400 illustrated in the Remote Review interface of FIG. 4 may correspond to text that was being displayed in the client 210 (i.e., in the streamed GUI) when the Remote Review mode was triggered.

In various embodiments, when the Remote Review mode is triggered, the client 210 can send a request to the agent 216 to download text from the document 220 and the agent 216 can send or download the requested text 224 to the client 210 on the mobile device 208 in response to the request. Not all the text in the remote document needs to be transferred. For example, in response to the request from the client 210, the agent 216 can determine what text of the document 220 is being displayed on the mobile device 208 screen or in the remote desktop GUI at the time and transfer that portion of the document 220 text. Afterwards, if the user requires more text than was sent 224 (i.e., portions that are either preceding or following the sent text 224), those portions can be requested by the client 210 and delivered by the agent 216. For example, in FIG. 4, if only the shown text 400 is available on the mobile device 208, when the user swipes up on the mobile device 208 screen, additional text following the current text 400 can be downloaded to the mobile device 208 from the document 220 on the server 202 (being sent by the agent 216) and displayed in the Remote Review mode. When the user swipes down on the mobile device 208 screen, additional text preceding the current text 400 can be downloaded to the mobile device 208 from the document 220 on the server 202 (being sent by the agent 216) and displayed in Remote Review mode.

After the text 224 is received from the server 202, it can be presented in the Remote Review interface to the user. As mentioned, the Remote Review mode provides the user with an enhanced ability to select text for performing various functions, such as to copy, look up, and forward the text selection. As illustrated in the example of FIG. 4, the text 224 can be presented by placing each word in a separate button that can be pressed to select the corresponding word. Once a button containing a word is pressed, it can change color or shade to indicate that the word has been selected. In various embodiments, the user can select continuous text by pressing and moving a finger on the screen, or they can select multiple separate words by tapping individual words one by one.

In another embodiment, the text can be presented without buttons and made to be selectable by pressing on an individual word to select the individual word (or in a defined vicinity of a word). In this case, a word can be highlighted once it is selected, for example, to indicate that the word has been selected. In other embodiments, different methods can also be used to make the text easily selectable on mobile devices and the invention is not limited to any particular approach. Once text is selected, the Remote Review interface can display a control panel that offers options for actions to take with respect to the selected text.

Figure 5:
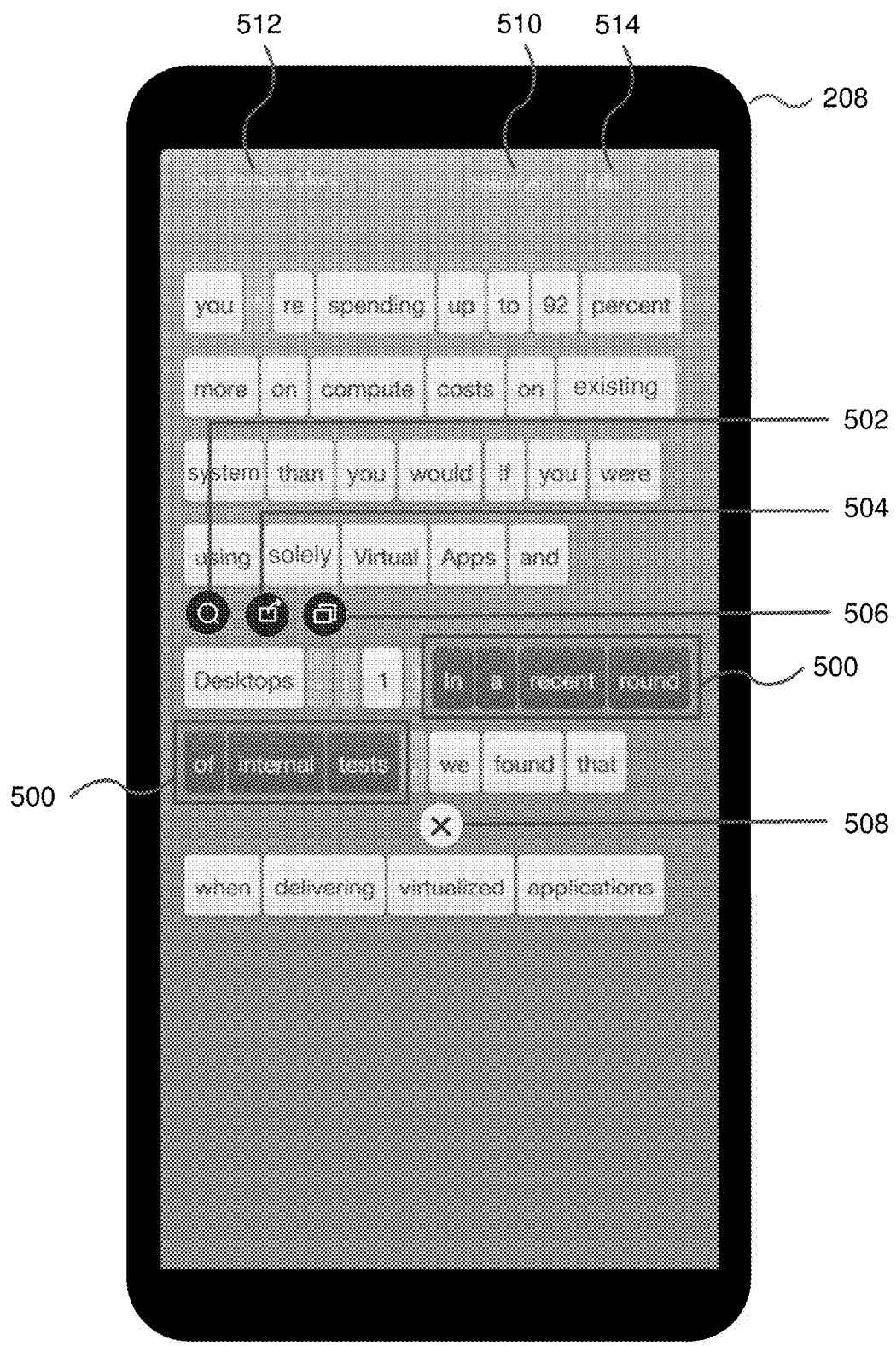
FIG. 5 illustrates an example of a mobile device in Remote Review mode displaying a control panel for a text selection, in accordance with various embodiments.

FIG. 5 illustrates an example of a mobile device in Remote Review mode displaying a control panel for a text selection, in accordance with various embodiments. In this case, the user has selected the highlighted text 500. In response to the selection, the Remote Review interface can present the user with a control panel that offers options for actions to take for the selected text, such as to copy, look up, and forward the selected text, or to cancel the selection. In this case, the control panel includes three buttons placed above the selected text 500, with a look-up button 502, a forward button 504, and a copy button 506. Below the selected text 500, the control panel presents a cancel button 508.

If the user selects to look-up the selected text (e.g., by pressing the look-up button 502), the selected text can be looked-up on the Internet and the results can be displayed to the user. For example, the client 210 can look-up the selected text using an Internet search engine, or the text can be forwarded to an Internet browser on the mobile device 210 and looked-up there. If the user selects to copy the selected text (e.g., by pressing the copy button 504), the client 210 can copy the selected text 500 to a clipboard on the mobile device 208, from where the user can paste the text 500 into the same or a different application. If the user selects to forward the selected text 500 (e.g., by pressing the forward button 506), the text 500 can be forwarded, e.g., by email, text message, etc. to another recipient. For example, the client 210 can open a messaging application (email, text, etc.) of the user's choice and allow the user to forward the selected text 500 to a recipient of the user's choice. If the user selects to cancel the text selection 500 (e.g., by pressing the cancel button 508), the text selection can be cancelled, and the control panel hidden from the interface until another text selection is made.

The Remote Review interface can further contain a Select All button 510, which can be pressed to select all text on the screen, and an Exit Remote Mode button 512, which can be pressed to exit the Remote Review mode, in which case the client 210 can return to displaying the remote document 220 in the remote desktop (e.g., by producing the streamed GUI from the remote desktop on the screen).

In various embodiments, if the end user desires to edit the document, the end user can activate a Remote Edit mode on the client 210. In an embodiment, the user can trigger the Remote Edit mode when in Remote Review mode by pressing an Edit button 514. In other embodiments, the user can be provided with other ways of activating the Remote Edit mode on the client 210, which can be either from the Remote Review mode as in the example of FIGS. 4 and 5 or directly from the remote document view as illustrated in FIG. 3 (in which case an input such as a button, menu item, or a type of press (e.g., long press of a certain time) can be designated for entering the Remote Edit mode).

Figure 6:
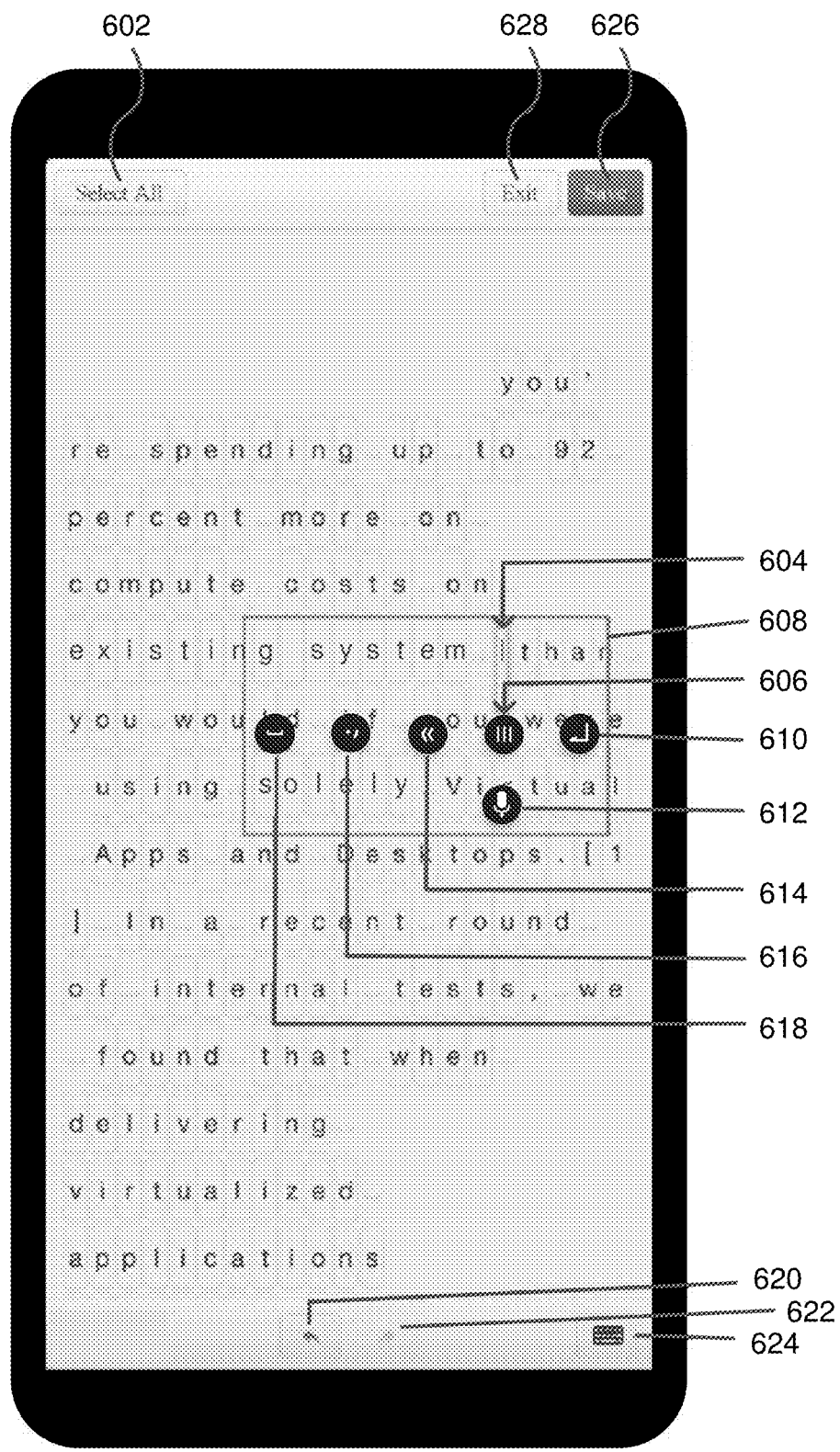
FIG. 6 illustrates an example of a mobile device in Remote Edit mode, in accordance with various embodiments.

FIG. 6 illustrates an example of a mobile device in Remote Edit mode, in accordance with various embodiments. As will be described in further detail below, the Remote Edit mode provides the user with an enhanced ability to edit text on the remote device 208. When the Remote Edit mode is activated, text that was displayed in the Remote Review mode can be displayed in the Remote Edit interface, as illustrated in the example of FIG. 6. In an embodiment, the text 224 transferred from the mobile device 208 can be displayed in the Remote Edit mode. In embodiments where the Remote Edit mode is triggered directly from the remote document 220 view, the text that is displayed in the remote document 220 on the mobile device 208 at the time can be transferred to the mobile device 208 and displayed in the Remote Edit mode. In the latter case, the text to be transferred from the remote document 220 can be determined and the transfer can be performed in the same way as describe above when Remote Review mode is activated.

Similar to when the client 210 is in the Remote Review mode, when the client 210 is in the Remote Edit mode and the user swipes up or down on the mobile device 208 screen, the client 210 can send a request to the agent 216 for more text which either follows or precedes, respectively, the text that is currently on the screen. When the agent 216 receives the request from the client 210, it can copy the following or preceding text from the remote document 220, as the case may be, and transfer the text to the client 210, which can display the text in the Remote Edit interface.

The Remote Edit mode can provide several features that enhance the user's ability to edit text on the mobile device 208. For example, as illustrated in the example of FIG. 6, text in Remote Edit mode can be presented by placing each character in a separate button that can be pressed to select the corresponding character. Once a button containing a character is pressed, it can change color or shade to indicate that the character has been selected. In various embodiments, the user can select continuous characters by pressing and moving a finger on the screen, or they can select multiple separate characters by tapping individual characters one by one. A Select All button 602 can also be available in the Remote Edit interface to select all characters on the screen. Once a text selection is made, the user can be presented with various options of what to do with the selected text, including an option to delete or copy the selected text, or cancel the selection.

The Remote Edit interface can further contain a cursor 604, which is placed between characters. In this case, since the characters are in buttons, the cursor 604 can be inserted between the character buttons. As with traditional editing programs, the user can make inputs that are inserted in the position of the cursor 604. For example, characters typed by the user can be inserted at the position of the cursor 604 and other commands such as delete, backspace, new line, etc. can take place at the position of the cursor 604. The user can move the cursor 604 about the interface by dragging or tapping a finger on the touchscreen. As illustrated, the interface can further utilize a protracted holder or handle 606 for the cursor 604 that enables the user to move the cursor 604 by placing the finger on the holder 606 and dragging the holder 606 on the touchscreen. In this example, the holder 606 is protracted down below the cursor 604. This way, when the user moves the cursor 604 by placing the user's finger one the holder 606 and moving it, the finger will not be blocking the user's view of the actual position of the cursor 604, making it more convenient to control cursor 604 position.

As illustrated, the Remote Edit interface can further contain a control panel 608, which in this case floats around the screen with or follows the cursor for user convenience. The control panel 608 can contain several buttons for carrying out various commands, including an insert space character button 618, an insert special character button 616, a delete character or "backspace" button 614, a voice input button 612, and a new line button 610. Pressing the voice input button 612 in the interface can enable the user to insert text (e.g., at the position of the cursor 604) by voice, that is, by speaking into the mobile device 208 and having the mobile device transcribe the speech. Pressing the new line button 618 in the interface can start a new line at the position of the cursor 604. Pressing the delete button 614 can remove or delete a character at the position of the cursor 604 (e.g., delete the character before the cursor 604). Pressing the special character button 616 in the interface can enable the user to select and insert at the cursor position 604 a special character from a special character list panel that pops up when the special character button 616 is pressed. Pressing the space button 618 can insert a space at the cursor position 604.

The interface can further contain an undo button 620 that can enable the user to revert to a previous step when pressed (i.e., to "undo" a previous action) and a redo button 622, which can reverse a previous undo action when pressed. Further, a virtual keyboard button 624 in the interface can enable the user to bring up a virtual keyboard for inputting text when pressed. The user can then type text on the virtual keyboard, which would be inserted at the position of the cursor.

After the user finishes editing the text, they can click a Save button 626, which can return the user back to the Remote Review mode. The Remote Review mode can now display the edited text for the user to review. Once back in the Remote Review mode, the user can click the Exit Remote mode button 512 button to exit Remote Review mode and return back to viewing the remote document 220 in the remote desktop. At this step, the edited text 226 can be sent to the remote desktop and inserted into a corresponding position in the remote document 220, so that the user can view the edited document in the remote desktop. The Remote Edit interface also contains an Exit button 628, which can be pressed by the user to return back to viewing the remote document 220 without going to the Remote Review mode first. At this step, the edited text can be sent to the remote desktop and inserted into a corresponding position in the remote document 220, so that the user can view the edited document in the remote desktop.

Figure 7:
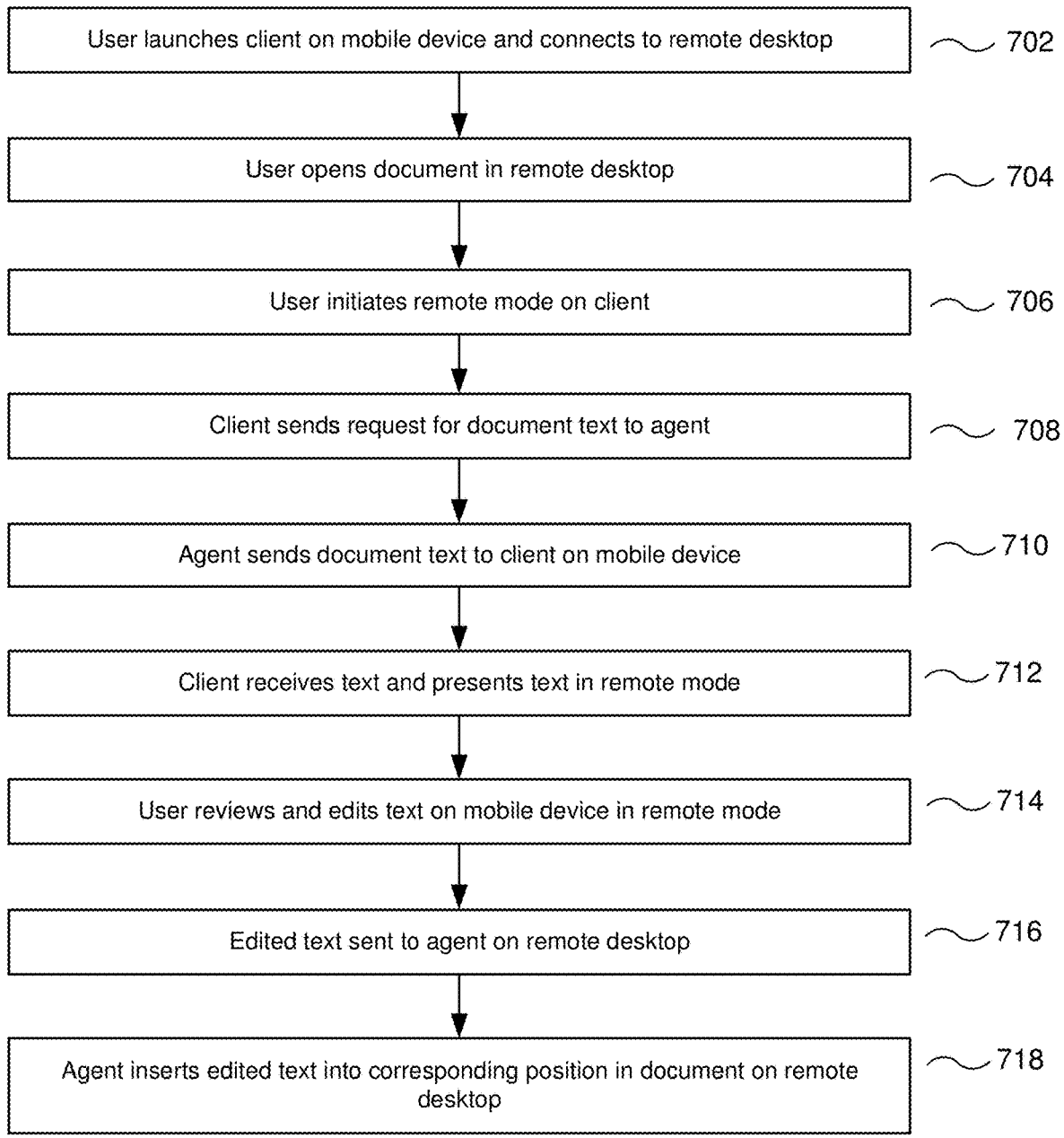
FIG. 7 illustrates an example process flow for efficient text editing in remote documents on mobile devices, in accordance with various embodiments.

FIG. 7, illustrates an example process flow for efficient text editing in remote documents on mobile devices, in accordance with various embodiments. The process begins in operation 702, where a user launches a client on the user's mobile device and connects to a remote desktop via the client 702. Once the mobile device client is connected to the remote desktop, the GUI of the remote desktop can be streamed to the client (by an agent on the remote desktop) and the client can convey the user's inputs into the remote desktop to the agent to be effectuated.

In operation 704, the user opens a document in the remote desktop, which may be opened in an application executing in the remote desktop. Once the document is opened in the application, a portion of the document (or the entire document) can be displayed in a window of the application and the streamed GUI can contain the portion of the document being displayed in the window of the application.

In operation 706, the user initiates a remote mode on the client. For example, the user may produce an input in the client, such as holding a finger on the screen for a predetermined amount of time, to trigger the remote mode. The remote mode may be a Remote Review mode and/or a Remote Edit mode, as described above, of any other mode allowing local editing and review of the document text on the mobile device.

In response to the user request to initiate the remote mode, in operation 708, the client can send a request to the agent on the remote desktop to transfer document text. For example, the client can request to download text corresponding to the portion of the document being displayed in the window of the application.

In operation 710, the agent can send document text to the client on the mobile device. For example, the agent can download text corresponding to the portion of the document being displayed in the window of the application to the mobile device. In an embodiment, the agent can copy the text displayed on the screen (e.g., on the mobile device screen or in the application UI on the remote desktop) to a clipboard on the remote desktop. The agent can then read the data from the clipboard and extract plain text from the clipboard data and send the plain text to the client for review and/or edit.

In operation 712, the client receives the text from the agent and presents the text in a remote mode. For example, the remote mode may be a Remote Review mode and/or a remote Edit mode as described above that allows local, mobile-friendly interaction with the text on the mobile device. In operation 714, the user can review and edit the text on the mobile device in the remote mode.

In operation 716, the edited text is sent by the client to the agent on the remote desktop. For example, after the user finishes editing, the user can select to save the text or to exit remote mode, and the client can then send the edited text to the agent. The edited text can be sent to the agent in a plain text format.

In operation 718, the agent can insert the received edited text into a corresponding position in the document on the remote desktop to update the remote document with the user's edits. For example, the agent can replace the portions of text in the document that were sent to the client with the edited text that it received from the client. As necessary, the received edited text can also be formatted to match the formatting of the corresponding text in the original document before it is inserted into the document. For example, received edited plain text can be merged with original formatting of the portion of the document corresponding to the downloaded text on the server. Namely, the edited plain text can be merged with the formatting of the portions of the document from where the text was originally copied to be sent to the mobile device in order to match the formatting of the edited text with the formatting of the original text in the document. In an embodiment, the edited text can be merged with formatting details of the copied text that were preserved when the text was copied from the document. For example, when the agent receives the edited text, it can merge it with the original clipboard data that the agent copied to the clipboard (in operation 710). In an embodiment, the agent can call an operating system API to set the edited text to the operating system clipboard. In other embodiments, the edited text can be merged with formatting of corresponding text in the document itself when the edited text is pasted over the document.

Different scenarios can arise for preserving formatting when inserting the edited text received from the client back into the document. In some cases, the original document text to be edited may be in pure text or in plain text format. For example, the text copied by the agent from the remote document and the clipboard text format may be "CF_TEXT". In this case, the pure or plain text can be sent to the client for editing and after the pure or plain text is edited on the mobile device, the edited text can be sent in pure or plain format back the agent. The agent can save the text as a clipboard data object in the pure or plain text format (e.g., in format of "CF_TEXT") and set the text back to the OS clipboard, from where it can be pasted into the document to update the document with the user's edits.

In some cases, the original document text to be edited may contain formatting. For example, the text copied by the agent from the remote document and the clipboard text format may be "HTML Format". The saved object is more complex than pure or plain text although it still contains pure or plain text. In this case, the pure or plain text can be extracted and the original format details of the copied text can be saved on the agent side. The pure or plain text can be transferred to the client. After editing on the mobile device, the pure or plain edited text can be sent back to the agent by the client. The agent can then merge the received pure or plain edited text with the original format details, save the formatted edited text as a data object (for example, in the format of "HTML Format") and set it back to OS clipboard, from where it can be pasted into the document to update the document with the user's edits.

In some cases, the document text to be edited may contain mixed data, such as data with images and text. In this case, only the text portions may be copied, edited, and pasted back into the document. For example, if the portion of the document being viewed when text is requested by the client contains images and text, the agent can copy only the text portions and transfer the copied text to the client. When edited text is received back at the agent, the edited text can be pasted over the text portion of the document while preserving the images in the document.

Figure 8:
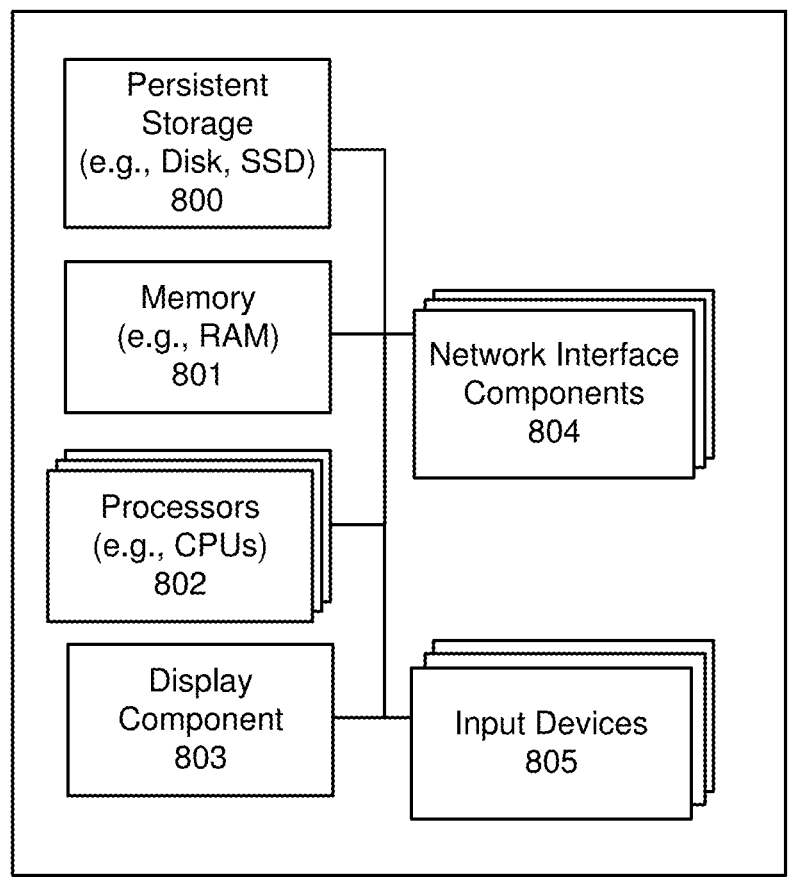
FIG. 8 illustrates an example of some general components of a computing device, in accordance with various embodiments.

FIG. 8 illustrates an example of some general components of a computing device, in accordance with various embodiments. In this particular example, the device includes one or more processors (e.g., central processing units (CPUs) 802 for executing instructions that can be stored in a storage medium component. The storage medium can include many types of memory, persistent data storage, or non-transitory computer-readable storage media. For example, the storage medium may take the form of random access memory (RAM) 801 storing program instructions for execution by the processor(s) 802, a persistent storage (e.g., disk or SSD) 800, a removable memory for sharing information with other devices and/or the like. The computing device typically can further comprise a display component 803, such as a monitor, a touch screen, liquid crystal display (LCD), or the like. In various embodiments, the computing device will include at least one input device 805 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 804 for communicating over various networks, such as a WI-FI®, BLUETOOTH®, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for locally editing text in a document opened in an application running in a virtual desktop executing on a remote server using a client running on a mobile device of a user, comprising:
    establishing a virtual desktop session on the virtual desktop by the client running on the mobile device, the client being configured to receive user inputs into the virtual desktop on the mobile device and to convey the received user inputs to the virtual desktop to be effectuated therein, wherein the client is further configured to present a graphical user interface (GUI) of the virtual desktop that is streamed to the client to the user on the mobile device;
    opening the document in the application running in the virtual desktop;
    streaming image data of the GUI containing at least a portion of the document displayed in a window of the application from the virtual desktop to the client running on the mobile device;
    in a client window on the mobile device, displaying the streamed image data of the portion of the document in the virtual desktop GUI;
    at the client, receiving a user request to place the portion of the document being displayed in the client window in a text editing interface allowing the user to edit the portion of the document locally on the mobile device;
    in response to the request to place the portion of the document being displayed in the client window in the text editing interface, conveying a request by the client to the virtual desktop to retrieve the portion of the document being displayed in the client window in an editable format;
    in response to the request to retrieve the portion of the document being displayed in the client window in an editable format, retrieving text corresponding to the portion of the document being displayed in the window of the application on the virtual desktop in an editable format and conveying the retrieved text to the client;
    by the client, presenting the retrieved text in the text editing interface that enables the user to edit the retrieved text locally on the mobile device;
    detecting, on the mobile device, a swipe action that causes the virtual desktop GUI to display a different portion of the document in the client window;
    requesting, by the client from the virtual desktop, additional text corresponding to the different portion of the document being displayed in the client window as a result of the swipe action; and
    presenting, by the client, the additional text received from the virtual desktop in the text editing interface.

2. The method of claim 1, wherein the text editing interface makes the text selectable by at least one of:
    enabling an individual word to be pressed in order to select the individual word; or
    placing each word within a separately displayed button that is capable of being pressed to select the each word.

3. The method of claim 2, wherein:
    the text editing interface provides an option to perform at least one of:
    copy selected text into a clipboard on the mobile device;

look up selected text using an Internet search engine on the mobile device; and forward selected text using a messaging application on the mobile device.

4. The method of claim 2, wherein: the text editing interface provides an option to cancel a selection of the text.

5. The method of claim 1, wherein:
user edits to the text are received on the mobile device through the text editing interface;
the edited text is sent to the server by the client on the mobile device; and
the edited text is inserted into a corresponding position in the document on the virtual desktop.

6. The method of claim 5, further comprising:
extracting, by the server, plain text data from the text requested by the mobile device and sending the plain text data to the mobile device in response to the request from the mobile device to retrieve the document text.

7. The method of claim 5, wherein the text editing interface includes at least one of:
a protracted holder for a cursor that enables a user to move the cursor by placing a finger on the holder and dragging the holder on a touchscreen of the mobile device;
a voice input button that enables a user to insert text using voice by pressing the voice input button;
a new line button in that enables a user to start a new line by pressing the new line button;
a delete button that enables a user to remove a character by pressing the delete button;
a special character button that enables a user to select and insert a special character from a popup special character list panel by pressing the special character button;
a space button that enables a user to insert a space by pressing the space button;
an undo button that enables a user to revert to a previous step by pressing the undo button;
a virtual keyboard button that enables a user to bring up a virtual keyboard for inputting text by pressing the virtual keyboard button; or
a separately displayed button containing each character that is capable of being pressed to select the each character.

8. A computing device for locally editing text in a document opened in an application running in a virtual desktop executing on a remote server using a client running on a mobile device of a user, comprising:
at least one processor; and
memory including instructions that, when executed by the at least one processor, cause the computing device to perform steps of:
establishing a virtual desktop session on the virtual desktop by the client running on the mobile device, the client being configured to receive user inputs into the virtual desktop on the mobile device and to convey the received user inputs to the virtual desktop to be effectuated therein, wherein the client is further configured to present a graphical user interface (GUI) of the virtual desktop that is streamed to the client to the user on the mobile device;
opening the document in the application running in the virtual desktop;
streaming image data of the GUI containing at least a portion of the document displayed in a window of the application from the virtual desktop to the client running on the mobile device;
in a client window on the mobile device, displaying the streamed image data of the portion of the document in the virtual desktop GUI;
at the client, receiving a user request to place the portion of the document being displayed in the client window in a text editing interface allowing the user to edit the portion of the document locally on the mobile device;
in response to the request to place the portion of the document being displayed in the client window in the text editing interface, conveying a request by the client to the virtual desktop to retrieve the portion of the document being displayed in the client window in an editable format;
in response to the request to retrieve the portion of the document being displayed in the client window in an editable format, retrieving text corresponding to the portion of the document being displayed in the window of the application on the virtual desktop in an editable format and conveying the retrieved text to the client;
by the client, presenting the retrieved text in the text editing interface that enables the user to edit the retrieved text locally on the mobile device;
detecting, on the mobile device, a swipe action that causes the virtual desktop GUI to display a different portion of the document in the client window;
requesting, by the client from the virtual desktop, additional text corresponding to the different portion of the document being displayed in the client window as a result of the swipe action; and
presenting, by the client, the additional text received from the virtual desktop in the text editing interface.

9. The computing device of claim 8, wherein the text editing interface makes the text selectable by at least one of:
enabling an individual word to be pressed in order to select the individual word; or
placing each word within a separately displayed button that is capable of being pressed to select the each word.

10. The computing device of claim 9, wherein:
the text editing interface provides an option to perform at least one of:
copy selected text into a clipboard on the mobile device;
look up selected text using an Internet search engine on the mobile device; and
forward selected text using a messaging application on the mobile device.

11. The computing device of claim 8, wherein:
user edits to the text are received on the mobile device through the text editing interface;
the edited text is sent to the server by the client on the mobile device; and
the edited text is inserted into a corresponding position in the document on the virtual desktop.

12. The computing device of claim 11, wherein:
the text editing interface is optimized for mobile devices and touch screens.

13. The computing device of claim 12, wherein the text editing interface optimized for mobile devices includes at least one of:
a protracted holder for a cursor that enables a user to move the cursor by placing a finger on the holder and dragging the holder on a touchscreen of the mobile device;
a voice input button that enables a user to insert text using voice by pressing the voice input button;
a new line button in that enables a user to start a new line by pressing the new line button;

a delete button that enables a user to remove a character by pressing the delete button;

a special character button that enables a user to select and insert a special character from a popup special character list panel by pressing the special character button;

a space button that enables a user to insert a space by pressing the space button;

an undo button that enables a user to revert to a previous step by pressing the undo button;

a virtual keyboard button that enables a user to bring up a virtual keyboard for inputting text by pressing the virtual keyboard button; or a separately displayed button containing each character that is capable of being pressed to select the each character.

14. The computing device of claim 11, wherein the memory further includes instructions that when executed by the at least one processor, cause the computing device to perform steps of:

extracting, by the server, plain text data from the text requested by the mobile device and sending the plain text data to the mobile device in response to the request from the mobile device to retrieve the document text.

15. A non-transitory computer readable storage medium for locally editing text in a document opened in an application running in a virtual desktop executing on a remote server using a client running on a mobile device of a user comprising one or more sequences of instructions, the instructions when executed by one or more processors causing the one or more processors to execute operations of:

establishing a virtual desktop session on the virtual desktop by the client running on the mobile device, the client being configured to receive user inputs into the virtual desktop on the mobile device and to convey the received user inputs to the virtual desktop to be effectuated therein, wherein the client is further configured to present a graphical user interface (GUI) of the virtual desktop that is streamed to the client to the user on the mobile device;

opening the document in the application running in the virtual desktop;

streaming image data of the GUI containing at least a portion of the document displayed in a window of the application from the virtual desktop to the client running on the mobile device;

in a client window on the mobile device, displaying the streamed image data of the at of the document in the virtual desktop GUI;

at the client, receiving a user request to place the portion of the document being displayed in the client window in a text editing interface allowing the user to edit the portion of the document locally on the mobile device;

in response to the request to place the portion of the document being displayed in the client window in the text editing interface, conveying a request by the client to the virtual desktop to retrieve the portion of the document being displayed in the client window in an editable format;

in response to the request to retrieve the portion of the document being displayed in the client window in an editable format, retrieving text corresponding to the portion of the document being displayed in the window of the application on the virtual desktop in an editable format and conveying the retrieved text to the client;

by the client, presenting the retrieved text in the text editing interface that enables the user to edit the retrieved text locally on the mobile device;

detecting, on the mobile device, a swipe action that causes the virtual desktop GUI to display a different portion of the document in the client window;

requesting, by the client from the virtual desktop, additional text corresponding to the different portion of the document being displayed in the client window as a result of the swipe action; and presenting, by the client, the additional text received from the virtual desktop in the text editing interface.

16. The non-transitory computer readable storage medium of claim 15, wherein the text editing interface makes the text selectable by at least one of:

enabling an individual word to be pressed in order to select the individual word; or placing each word within a separately displayed button that is capable of being pressed to select the each word.

17. The non-transitory computer readable storage medium of claim 16, wherein:

the text editing interface provides an option to perform at least one of:

copy selected text into a clipboard on the mobile device;

look up selected text using an Internet search engine on the mobile device; and forward selected text using a messaging application on the mobile device.

18. The non-transitory computer readable storage medium of claim 15, wherein:

user edits to the text are received on the mobile device through the text editing interface;

the edited text is sent to the server by the client on the mobile device; and the edited text is inserted into a corresponding position in the document on the virtual desktop.

19. The non-transitory computer readable storage medium of claim 18, wherein:

the text editing interface is optimized for mobile devices and touch screens.

20. The non-transitory computer readable storage medium of claim 18, further comprising instructions that when executed by the one or more processors cause the one or more processors to execute operations of:

extracting, by the server, plain text data from the text requested by the mobile device and sending the plain text data to the mobile device in response to the request from the mobile device to retrieve the document text.

* * * * *